US010497071B2

(12) United States Patent
Gosink et al.

(10) Patent No.: US 10,497,071 B2
(45) Date of Patent: Dec. 3, 2019

(54) MULTI-DOMAIN SITUATIONAL AWARENESS FOR INFRASTRUCTURE MONITORING

(71) Applicant: Battelle Memorial Institute, Richland, WA (US)

(72) Inventors: Luke J. Gosink, Richland, WA (US); Edwin R. Burtner, Richland, WA (US); Jodi H. Obradovich, Tigard, OR (US); Scott T. Dowson, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 464 days.

(21) Appl. No.: 14/167,807

(22) Filed: Jan. 29, 2014

(65) Prior Publication Data
US 2014/0280909 A1 Sep. 18, 2014

Related U.S. Application Data

(60) Provisional application No. 61/801,035, filed on Mar. 15, 2013.

(51) Int. Cl.
*G06Q 50/06* (2012.01)
*G06Q 10/06* (2012.01)

(52) U.S. Cl.
CPC .......... *G06Q 50/06* (2013.01); *G06Q 10/06* (2013.01)

(58) Field of Classification Search
CPC .............................. G06Q 50/06; G06Q 10/06
USPC ................................................ 709/223, 224
See application file for complete search history.

(56) References Cited

U.S. PATENT DOCUMENTS

| | | | |
|---|---|---|---|
| 7,577,906 B2 | 8/2009 | Friedrichowitz et al. | |
| 8,001,204 B2 | 8/2011 | Burtner et al. | |
| 8,099,458 B2 | 1/2012 | Burtner, IV et al. | |
| 8,261,193 B1* | 9/2012 | Alur | G06Q 10/101 715/742 |
| 9,252,915 B1* | 2/2016 | Bakken | H04L 1/0002 |
| 9,495,557 B2* | 11/2016 | Paymal | G06F 21/6227 |
| 9,569,467 B1* | 2/2017 | Schechter | G06F 17/30283 |
| 2004/0107368 A1 | 6/2004 | Colvin | |
| 2004/0239550 A1* | 12/2004 | Daly, Jr. | G01S 13/723 342/26 B |
| 2004/0267691 A1 | 12/2004 | Vasudeva | |

(Continued)

OTHER PUBLICATIONS

International Search Report for PCT/US14/11122, dated Jun. 10, 2014, 2 pages.
(Continued)

*Primary Examiner* — Viet D Vu
(74) *Attorney, Agent, or Firm* — Klarquist Sparkman, LLP

(57) ABSTRACT

Apparatus and methods are disclosed for a monitoring system that integrates multi-domain data from weather, power, cyber, and/or social media sources to greatly increase situation awareness and drive more accurate assessments of reliability, sustainability, and efficiency in infrastructure environments, such as power grids. In one example of the disclosed technology, a method includes receiving real-time data from two or more different domains relevant to an infrastructure system, aggregating the real-time data into a unified representation relevant to the infrastructure system, and providing the unified representation to one or more customizable graphical user interfaces.

23 Claims, 7 Drawing Sheets

(56) References Cited

U.S. PATENT DOCUMENTS

| | | | |
|---|---|---|---|
| 2006/0106509 A1* | 5/2006 | Robb | G05B 23/0216 |
| | | | 701/29.1 |
| 2006/0245558 A1 | 11/2006 | Gatzke et al. | |
| 2007/0156544 A1 | 7/2007 | Meyer et al. | |
| 2008/0059242 A1 | 3/2008 | Stanford | |
| 2008/0276201 A1 | 11/2008 | Risch et al. | |
| 2009/0195349 A1* | 8/2009 | Frader-Thompson | ............ |
| | | | G01D 4/002 |
| | | | 340/3.1 |
| 2010/0289643 A1* | 11/2010 | Trundle | F24F 11/0086 |
| | | | 340/545.1 |
| 2010/0293501 A1 | 11/2010 | Russ et al. | |
| 2010/0306004 A1 | 12/2010 | Burtner et al. | |
| 2011/0099616 A1* | 4/2011 | Mazur | H04L 63/0846 |
| | | | 726/7 |
| 2011/0137989 A1 | 6/2011 | Kiciman et al. | |
| 2011/0184574 A1* | 7/2011 | Le Roux | G01D 4/004 |
| | | | 700/291 |
| 2012/0007982 A1 | 1/2012 | Giuffrida et al. | |
| 2012/0278015 A1 | 11/2012 | Budhraja et al. | |
| 2013/0044114 A1 | 2/2013 | Burtner | |
| 2013/0159512 A1* | 6/2013 | Groves | H04L 43/045 |
| | | | 709/224 |
| 2013/0268129 A1* | 10/2013 | Fadell | G06Q 10/20 |
| | | | 700/278 |

OTHER PUBLICATIONS

Written Opinion for PCT/US14/11122, dated Jun. 10, 2014, 6 pages.
Burtner et al., "Interactive Visual Comparison of Multimedia Data through Type-specific View," *Proceedings of the SPIE, Visualization and Data Analysis 2013*, Feb. 2013, 15 pages.
Dillard et al., "Coherent Image Layout using an Adaptive Visual Vocabulary," *Proceedings of the SPIE, Image Processing: Machine Vision Applications*, Mar. 2013, 14 pages.
Engel et al., "Events and trends in text streams," *Text Mining: Applications and Theory*, 2010, 17 pages.
Jin et al., "A Novel Application of Parallel Betweenness Centrality to Power Grid Contingency Analysis," *2010 IEEE International Symposium on Parallel & Distributed Processing (IPDPS)*, Apr. 2010, 7 pages.
Pacific Northwest National Laboratory, "Core Area: Analytic Methods," last updated Feb. 2013, 3 pages.
Pacific Northwest National Laboratory, "Core Area: Information Signatures," last updated Feb. 2013, 9 pages.
Pacific Northwest National Laboratory, "Core Area: Natural User Interactions," last updated Feb. 2013, 2 pages.
Pacific Northwest National Laboratory, "Core Area: User Experience," last updated Feb. 2013, 2 pages.
Pacific Northwest National Laboratory, "Core Area: Visual Design," last updated Feb. 2013, 3 pages.
Pacific Northwest National Laboratory, "Scalable Reasoning System," Sep. 2012, 2 pages.
Pacific Northwest National Laboratory, STARLIGHT Visual Information System™, last updated Oct. 2011, 2 pages.
Pike et al., "The Scalable Reasoning System: Lightweight Visualization for Distributed Analytics," *IEEE Symposium on Visual Analytics Science and Technology*, Oct. 2008, 8 pages.
Wong et al., "Extreme-Scale Visual Analytics," *IEEE Computer Graphics and Applications*, vol. 32, Issue 4, Jul.-Aug. 2012, 3 pages.
Wong et al., "A Novel Visualization Technique for Electric Power Grid Analytics, Manuscript ID" *IEEE Transactions on Visualization and Computer Graphics*, 2008, 14 pages.
Wong et al., "A Space-Filling Visualization Technique for Multivariate Small-World Graphs," *IEEE Transactions on Visualization and Computer Graphics*, vol. 18, No. 5, May 2012, 13 pages.

\* cited by examiner

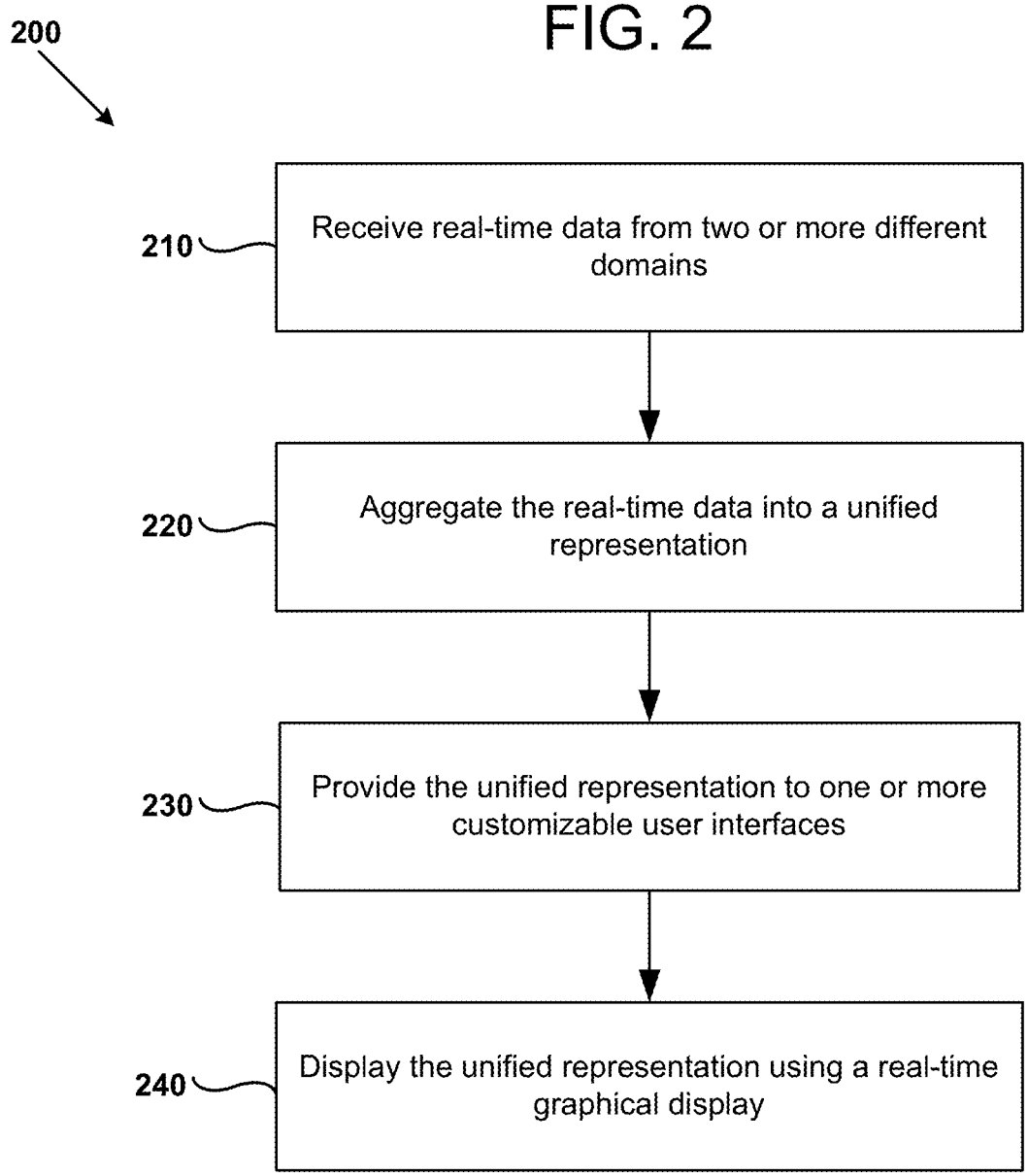

MULTI-DOMAIN SITUATIONAL AWARENESS FOR INFRASTRUCTURE MONITORING

CROSS-REFERENCE TO RELATED APPLICATIONS

This application claims the benefit of U.S. Provisional Application No. 61/801,035, filed Mar. 15, 2013, entitled "SYSTEM FOR MONITORING POWER GRID RESOURCES AND SUPPORTING SITUATION AWARENESS THROUGH INTEGRATED MULTI-RESOLUTION, MULTI-DOMAIN INFORMATION," which application is incorporated herein by reference in its entirety for all purposes.

GOVERNMENT RIGHTS STATEMENT

This invention was made with Government support under contract number DE-AC05-76RLR01830 awarded by the U.S. Department of Energy. The Government has certain rights in the invention.

BACKGROUND

Existing infrastructure monitoring systems (e.g., power grid monitoring systems) provide some visibility for monitoring infrastructure in a single domain, but lack the ability to combine multi-domain information, including data from non-infrastructure sources, such as cyber and social media sources, let alone combine such multi-domain information with infrastructure monitoring data in a coherent manner. Further, such systems lack the use of a general-purpose user interface to allow easy deployment across multiple domains. Hence, there is ample opportunity for improvement to systems for combining and visualizing multi-domain infrastructure information.

SUMMARY

Infrastructure monitoring systems are disclosed that integrate multi-domain data from weather, power, cyber, and/or social media sources to greatly increase power grid situation awareness (SA) and drive more accurate assessments of grid reliability, sustainability, and efficiency. In an exemplary embodiment, an infrastructure monitoring system visually integrates such multi-domain data through a combination of multi-resolution spatial and temporal views. These views convey both raw data from disparate domains that can impact the power grid, as well as important trends based on information extracted from this data. The system itself can be implemented through a combination of thin web-based clients and thick user interfaces that allow authorities to securely and easily access this information from a variety of sources, ranging from hand-held devices that are used in field work, to workstations being used in infrastructure control rooms.

Additionally, the disclosed monitoring systems allow information based on the multi-domain data to be shared—in as restricted or as free a manner as desired—with other authorities. In this context, SA is greatly increased as authorities are able to obtain secure and immediate information about other authorities and rapidly identify threats to the power grid that arise from the external, but influential, domains including cyber events, weather events, and events identified from social media sources.

In some examples of the disclosed technology, computer-implemented methods of monitoring multiple-domain data for interdependent infrastructure systems include receiving real-time data from two or more different domains relevant to an infrastructure system, aggregating the real-time data into a unified representation relevant to the infrastructure system, and providing the unified representation to customizable user interfaces.

In some examples, the methods for monitoring multiple-domain data further include displaying the unified representation in real-time using a graphical display interface, where the displaying represents data from at least two of the different domains in a single set of unified interface objects. In some examples, the displaying comprises displaying graphs, trend lines, social media feeds, geospatial data, and/or power grid operating parameter data, all of which can be displayed along a time-based axis.

In some examples of the disclosed technology, customizable user interfaces receive access to different portions of a unified representation based on permissions associated with each of the different domains, and allow interface users to control which portion of a unified representation to display. In some examples, the domains include utility infrastructures, weather reporting services, cyber-alert reporting services, and/or social media providers.

Some examples of the disclosed methods can be implemented using one or more non-transitory computer-readable storage media storing computer-executable instructions that when executed by a computing device, cause the computing device to perform one or more of the disclosed methods.

In some examples, an Aggregation Server includes one or more processors, one or more graphical displays configured to display a unified representation in real-time, and computer-readable storage media storing computer-executable instructions that cause the Aggregation Server (in some instances, in cooperation with a number of computing client domains) to perform one or more of the methods disclosed herein.

In some examples of the disclosed technology, a system for providing real-time situational awareness in an infrastructure environment includes one or more databases, one or more processors configured to store and access aggregated data stored in the databases, and computer-readable storage devices including instructions for receiving a first set of real-time time data from a first client domain, instructions for receiving a second set of real-time data from a second client domain, instructions for aggregating data from the received first and second sets of real-time data and storing the aggregated data in the databases, and instructions for providing the aggregated data for display with a graphical display user interface operable to display at least a portion of the first set of real-time data and at least a portion of the real-time data in a unified interface.

In some examples, the system further includes instructions for displaying the portions of real-time data superimposed over a geospatial display, including data for: power grid capacity data, power grid topology data, power grid connectivity data, social media data, and/or weather data.

In some examples, computer-readable storage media store computer-executable instructions for causing a computer to perform methods that includes collecting real-time data representing the status of one or more infrastructure systems and sending the data to one or more authorities for other infrastructure systems. In some examples, the methods further include determining an access level for at least one of the authorities and based on the access level, determining the amount and type of data to send to the at least one authority.

In some examples, the methods further include sending the data to an intermediary system for sharing with other infrastructure systems, where access to the data by the other infrastructure systems is determined based at least in part on access permissions designated in the sent data by an authority of the one or more infrastructure systems.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures. Any trademarks used herein are the property of their respective owners.

BRIEF DESCRIPTION OF THE DRAWINGS

FIG. 2 is a flow chart outlining an exemplary method as can be used in certain embodiments of the disclosed technology.

DETAILED DESCRIPTION

I. Introduction to the Disclosed Technology

Figure 1:
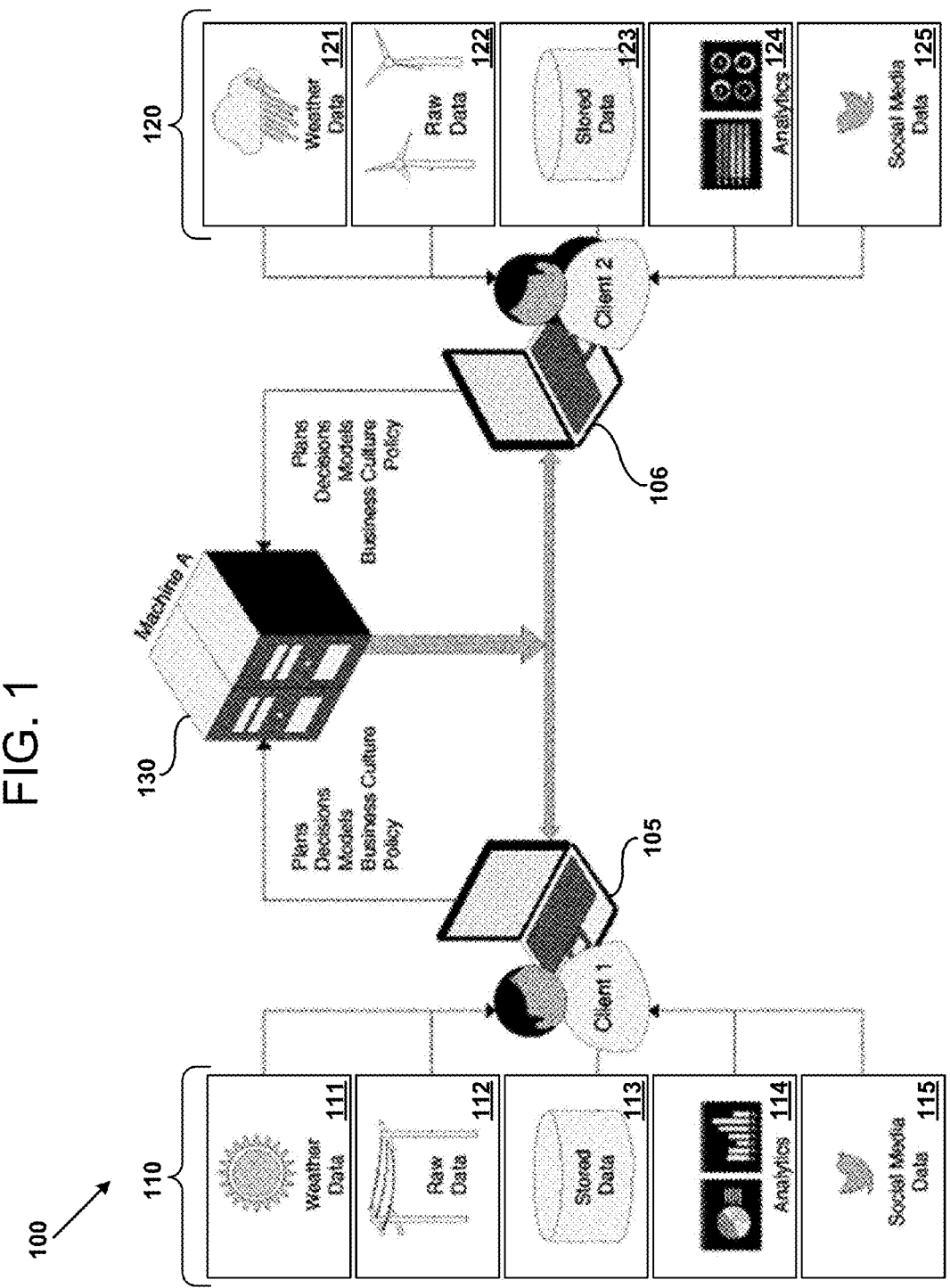
FIG. 1 is a network diagram illustrating a computing environment in which described embodiments, techniques, and technologies, including monitoring and reporting of real-time multi-domain data, can be implemented.

A sustainable and efficient Smart Grid implementation utilizes real-time information transparency and wide-area situation awareness (SA) for operators and reliability coordinators. Without real-time, system-wide, infrastructure awareness, the potential for a small local instability to cascade into a large-scale blackout event is significant. The level of situation awareness can take into account multiple external domains that can impact the infrastructure (e.g., an alternating current (AC) power grid, natural gas pipeline, air traffic control system, or other suitable infrastructure). Additionally, some embodiments of the disclosed technology provide an ability to communicate and share information with neighboring utilities (e.g., to coordinate mitigation efforts or send alerts). To address these needs in the future power grid (FPG), wide-area situation awareness and reliable decision support for FPG operations can include capabilities for: real-time, intuitive comprehension of large, complex streams of multi-domain data, and the capacity to share, effectively and securely, critical pieces of this data with others. The disclosed technologies can be used to address these issues.

Certain embodiments of the disclosed technology provide greater situation awareness (SA) through a three-part system that integrates: multi-domain data and information to provide multi-resolution spatial and temporal views. Such exemplary systems can facilitate access of this information across web-based and other networked clients in order to share state and other data with neighboring authorities.

The use of multi-domain information allows grid operators and engineers to readily identify threats to the grid based on data that is not inherently tied to (but could impact) the power infrastructure. For example, power system data can be augmented with weather, cyber, and social media data.

The use of weather data allows for engineers to identify and plan for the effects of weather on the grid. Cyber information readily identifies—through visual alarms and detailed messages—compromised data streams that indicate an adversarial attack is taking place on targets near to the authority, or on the authority itself. The use of social media provides the authorities with a faster means to monitor problems as expressed by customers and other agencies. In this context, social media provides a larger window of time to react to such issues. For example, social media can rapidly identify when customers are experiencing problems, even when the system appears normal to the infrastructure operators.

The use of multi-resolution spatial and temporal views allows for grid operators and engineers to readily focus on general and specific aspects of information as needed. Such systems can be customized for the user so that it is possible to view both very specific information (e.g. output of certain substations) while simultaneously monitoring (e.g., as a visual overlay) very general information (e.g. current and future weather data). This flexibility applies to both spatial and temporal aspects of data so that locations and times of critical power, weather, cyber, and social-related events can be identified and planned for.

In some embodiments, the system is built using thin web-based clients to support secure, distributed access. As a web-based client, an interactive user interface (UI) can be accessed and used over hand-held devices to support field work (e.g. logging maintenance) or in a control room (e.g., for a power plant or electric grid) for more detailed monitoring.

In some embodiments, the system is almost entirely web-based. For example, technologies including HTML5, Asynchronous JavaScript and XML (AJAX), Flash, JavaScript, or other suitable technologies can be employed to provide an interface for the web-based clients. The UI can therefore be accessed practically anywhere over a wide variety of devices, allowing for easy deployment.

Thus, the technologies disclosed herein allow for integrating data form domains that closely impact power grid reliability and sustainability. Additionally, authorities are provided with ways to easily share portions of this information with others through a secure, web-based UI.

II. General Considerations

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "aggregate," and "combine" to describe the disclosed methods. These terms are high-level abstractions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable media, such as one or more optical media discs, volatile memory components (such as dynamic RAM (DRAM) or static RAM (SRAM)), or nonvolatile memory components (such as hard drives or solid state drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer or in a network environment (e.g., via the Internet, a wide-area network, a local-area network, a client-server network (such as a cloud computing network), or other such network) using one or more networked computers.

For clarity, only certain selected aspects of the software-based implementations are described. Other details that are well-known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

III. Example Networking Environment for Implementing Embodiments of the Disclosed Technology An example of a suitable network topology (e.g., a client-server network) for implementing a three-part system that integrates multi-domain data and information to provide multi-resolution spatial and temporal views is depicted in FIG. 1. As shown, a network diagram illustrates a computing environment 100 having a number of networked computing devices being accessed by two client computers 105 and 106 operating in two different domains labeled Client 1 and Client 2. As illustrated in FIG. 1, Client 1 has access to a first set 110 of data sources in the Client 1 domain (e.g., using its client computer 105), while Client 2 has access to a second set 120 of data sources in the Client 2 domain (e.g., using its client computer 106).

Each of the client computers 105 and 106 can be, for example, a laptop, a desktop computer, a touch screen tablet, a mobile phone, and/or a smart phone. Some of the computing devices, for example, the mobile phone and the smart phone, can transmit data wirelessly using a cellular connection. In some examples, Client 1 and Client 2 are domains for two completely separate organizations (e.g., a governmental agency and a private utility) while in other examples, Client 1 and Client 2 are domains for two different sub-organizations within the same overall organization (e.g., a first sub-organization responsible for power generation and a second sub-organization responsible for power distribution, or a first sub-organization responsible for real-time operations and a second sub-organization responsible for planning). As will be readily understood by one of ordinary skill in the art, any number of different Clients can be connected using the network, so not all examples are limited to a three-part system as shown in FIG. 1.

As shown in FIG. 1, the first set 110 of data sources includes weather data 111, raw data 112 relating to a power distribution grid, stored data 113, analytic data 114, and social media data 115, each of which is specific to the Client 1 domain. For example, weather data 111 might be obtained from commercial or governmental online sources, such as the National Oceanic and Atmospheric Administration (NOAA). The power distribution grid raw data 112 is typically proprietary and not generally available to the public. The raw data 112 can include data produced by interdependent infrastructure systems, including a power plant systems, power grid operators, and/or pipeline operators. In some examples, the data in the first set 110 and/or the second set 120 are received in real-time.

In some examples, one or more of the computing devices are configured to send and receive social media data 115 to/from a social media provider using techniques readily discernible to one of ordinary skill in the art. For example, suitable social media providers include Facebook, Twitter, Flickr, Instagram, Google+, and Pintrest. Such data can include status updates including hashtags (indicating a topic, such as "#power outage") and addressees (e.g., @mentions such as "@CityofPortland"). The sources of social media data 115 can be defined based on, for example, a subset of utility customers or geolocation data associated with the social media data.

The stored data 113 and analytic data 114 can be public or proprietary, and can be produced by various data services, such as cyber information services (e.g., alerts published by the United States Computer Emergency Readiness Team (US-CERT)). Additional examples of suitable data sources for use with examples disclosed herein include current and historical data, metadata, and other information based on power grid and other domains. For example, utilities can store annual wind trends to help identify times of the year when weather forecasting is least reliable and use of wind renewables is most risky.

The second set 120 of data includes similar data to those in the first set 110, but specific to the Client 2 domain: weather data 121, raw data 122 relating to a power distribution grid, stored data 123, analytic data 124, and social media data 125.

Also illustrated in FIG. 1 is an intermediary computer system, subbed an Aggregation Server 130, that can be accessed by computers that are in either of the Client 1 and Client 2 domains. The Aggregation Server 130 provides "Shared Perspective" services to users in the Client 1 and Client 2 domains. In some examples, the intermediary computer system can be provisioned in a computing cloud.

Computing devices, infrastructure systems, and data service providers located in the Client 1 Domain and the Client 2 domain can communicate with each other via a communication network (e.g., a local area network (LAN), the Internet, a wide area network (WAN), a private network, and/or other suitable computing network), either directly or via the Aggregation Server 130. The computing devices, infrastructure systems, and data service providers are not limited to traditional personal computers but can comprise other computing hardware configured to connect to and communicate with a network (e.g., smart phones or other mobile computing devices, servers, network devices, dedicated devices, appliances, and the like).

The Aggregation Server 130 takes selected data received from Clients (e.g., client computer 105 and 106) and integrates the data for presenting in a manner conducive to analyzing. In some examples, access permissions for the data are controlled by policies applied by data producers in the Client domains. In some examples, the Aggregation Server 130 supplements or provides all access controls to the data. In some examples, the Aggregation Server 130 processes the data to produce visualization data that can be viewed by users in the Client domains at varying levels of detail.

The Aggregation Server 130 acts as an intermediary system that can receive and send data to any of the connected devices, systems, and/or providers. In some examples, the intermediary system can be used to broker or filter access to real-time data received by the intermediary from connected sources. For example, data sent between a power plant system and a power grid operator may be allowed access to a higher security level of data than data sent between the power plant system and a social media provider, depending on preferences established by the data sender and/or access credentials held by the data receiver. In other examples, each of the connected devices, systems, and/or providers controls access to transmitted data by negotiating with each of the receiving systems in a distributed manner.

In some examples, data sent between Clients and the Aggregation Server 130 is encoded in an eXtensible Markup Language (XML) and communicated using web application protocols. In some examples, the Aggregation Server 130 includes software layering implementing listening sockets implemented in a web services layer to monitor data from Clients (e.g., Client 1 or Client 2). The Aggregation Server 130 can control access to integrated data in a number of different ways. For example, access to data can be restricted based not only on who can access data, but also based on when or how often data is shared with other Clients.

Described embodiments, techniques, and technologies, including monitoring and reporting of real-time data, can be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

In some embodiments, each of the Client computing devices and the Aggregation Server 130 includes at least one central processing unit and memory. The central processing unit executes computer-executable instructions and may be a real or a virtual processor. In a multi-processing system, multiple processing units execute computer-executable instructions to increase processing power and as such, multiple processors can be running simultaneously. The memory can be volatile memory (e.g., registers, cache, RAM, non-volatile memory (e.g., ROM, EEPROM, flash memory, etc.), or some combination of the two. The memory stores software, images, and video that can, for example, implement the technologies described herein. A computing environment 100 may have additional features. For example, the computing environment 100 includes storage (e.g., a hard drive or solid state drive (SSD)), one or more input devices, one or more output devices, and one or more communication connections. An interconnection mechanism such as a bus, a controller, or a network, interconnects the components of the computing environment 100 shown in FIG. 1. Typically, operating system software (not shown) provides an operating environment for other software executing in the computing environment 100, and coordinates activities of the components of the computing environment.

The storage may be removable or non-removable, and includes magnetic disks, magnetic tapes or cassettes, CD-ROMs, CD-RWs, DVDs, or any other medium which can be used to store information and that can be accessed within the computing environment 100. The storage stores instructions for the software and data sets, which can implement technologies described herein.

The input devices can include a touch input device, such as a keyboard, keypad, mouse, touch screen display, pen, or trackball, a voice input device, a scanning device, or another device, that provides input to the computing environment 100. For audio, the input devices may be a sound card or similar device that accepts audio input in analog or digital form, or a CD-ROM reader that provides audio samples to the computing environment 100. The output devices may be a display, printer, speaker, CD-writer, or another device that provides output from the computing environment 100.

Communication connections enable communication over a communication medium (e.g., a connecting network) to another computing entity. The communication medium conveys information such as computer-executable instructions, compressed graphics information, video, or other data in a modulated data signal.

Some embodiments of the disclosed methods can be performed using computer-executable instructions implementing all or a portion of the disclosed technology in a computing cloud. For example, real-time data can be sent and/or received in the computing environment 100 from Clients while monitoring multiple-domain data with the Aggregation Server 130.

Computer-readable media are any available media that can be accessed within a computing environment 100. By way of example, and not limitation, computer-readable media include memory and/or storage. As should be readily understood, the term computer-readable storage media includes the media for data storage such as memory and storage, and not transmission media such as modulated data signals.

IV. Example Method of Generating and Displaying a Unified Representation

FIG. 2 is a flow chart 200 detailing an exemplary method of generating and displaying a unified representation of real-time data in a multi-domain infrastructure system, as can be practiced using certain embodiments of the disclosed technology.

At process block 210, real-time data is received (e.g., by the Aggregation Server 130) from two or more different domains, for example, infrastructure systems such as power plants, power grids, or pipelines, data services, cyber information services, and/or social media providers. Examples of suitable real time data include power grid electrical data such as frequency and power, power generation, anticipated uptimes and/or downtimes, geospatial data, security alerts, weather information, news information, and messages, such as email or tweets. Such messages can include identifiers generated by the sending user that can be used to augment or in place of keyword searches for identifying messages that might be relevant to, for example, authorities that control infrastructure systems. After receiving the real-time data, the method proceeds to process block 220.

At process block 220, the real-time data is aggregated into a real-time representation. In some examples, the real-time representation is represented using established standards for data transmission and display (e.g., XML, hypertext markup language (HTML), or other suitable standards or protocols), while in other examples, a customized or proprietary representation can be used. Real-time data for multiple domains can be analyzed and grouped into associations based on the relevance of data to each other. The relevance of data can be determined using, for example, an ontology accessible by the Aggregation Server 130 and geolocation information derived from real-time data (e.g., from Client computers 105 and/or 106). For example, social media messages discussing power outages (e.g., by mentioning key words "power" and/or "outage," hashtags, or other identifiers) can be identified as relevant and collected to be displayed adjacent to real-time data regarding power grid performance. In other examples, weather, cyber-alerts, or other similar data can be associated with relevant data provided by infrastructure systems. In some examples, geospatial data associated with the real-time can be correlated and displayed. After generating a unified representation of the multi-domain data, the method proceeds to process block 230.

At process block 230, the unified representation is provided to one or more customizable user interfaces that can provide real-time data display. In some examples, computing device, infrastructure providers, and other connected devices can exchange data for the unified representation between each other directly, based on, for example, access permissions or credentials associated with the data sender or receiver. In other examples, the unified representation can be sent to an intermediary (e.g., a "sandbox" located in the Aggregation Server 130), which in turn controls access to data in the unified representation.

At process block 240, receivers of the unified representation display portions of the unified representation using a real-time graphical display. For example, web-based visualization frameworks such as Pacific Northwest National Laboratory's Scalable Reasoning System (SRS) provides interface widgets for visualizing word clusters, dimensions of structured data, tree map visualizations, and story flow visualization for analyzing themes in data and their change over time. For example, U.S. patent application Ser. No. 13/211,587 discloses methods for displaying large amounts of data in a manner that communicates context, content, and relationships among the data, as can be used in some examples of the disclosed technology. Web technologies can be employed to display the data, for example, as discussed below regarding FIGS. 3A-3E. Thus, the method outlined in FIG. 2 allows multiple users from different domains to exchange and view data in a unified, yet fully customizable manner, without comprising security or confidentiality of the exchanged data.

V. Example Graphical Displays of Multi-Domain Data from Unified Representations

FIGS. 3A-3E illustrate a number of graphical display interfaces showing aggregated data from multiple domains, including infrastructure, cyber, data, social media, and other data domains, as can be used in certain embodiments of the disclosed technology. An exemplary system for producing such graphical displays is the Scalable Reasoning System, although other suitable systems can also be employed. The graphical display interfaces illustrated in FIGS. 3A-3E can be deployed within a computing environment 100 such as that illustrated in FIG. 1 above. Further, methods for generating and displaying unified real-time data representations can be used to aggregate and display data in the graphical display interfaces discussed below.

Figure 3A:
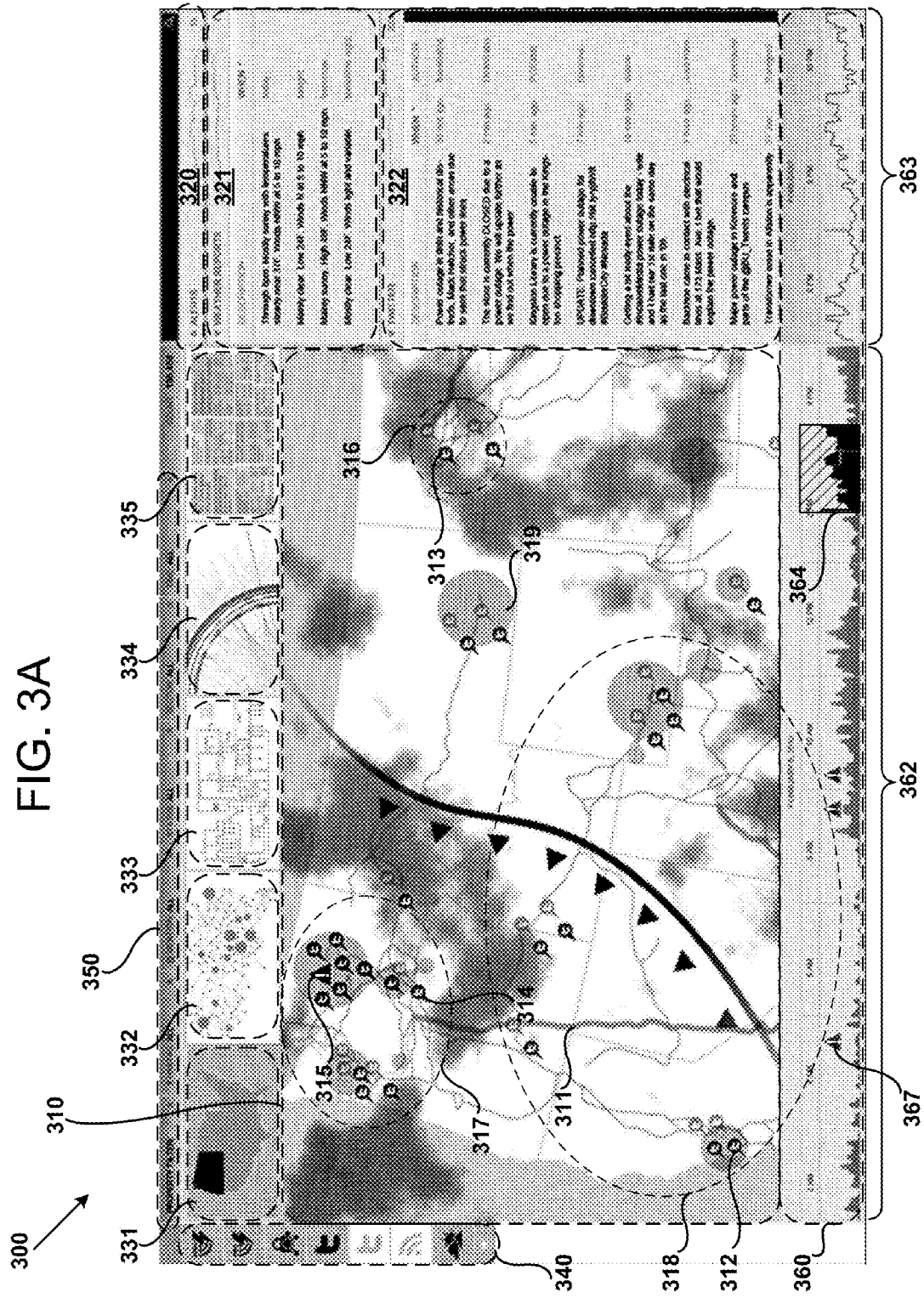
FIGS. 3A-3E illustrate real-time displays provided by a graphical display interface, as can be used in certain embodiments of the disclosed technology.

FIG. 3A is a graphical display interface 300 showing real-time data, including a real-time geospatial display 310. As shown, the geospatial display 310 includes a map of the western United States with superimposed weather information, in the form of atmospheric data and weather fronts. Also shown on the map are notable power grid infrastructure (e.g., the Pacific direct current (DC) Intertie 311), geospatial data (as indicated by, e.g., social media callouts 312-314 and an event callout 315 within, e.g., dashed regions 316-318) associated with social media messages determined to be relevant to an infrastructure provider (e.g., a power grid operator). Power grid topology, capacity, and connectivity data are also displayed in the graphical display interface 300 (e.g., capacity indicator 319). Panes to the right side of the window display incoming alerts (pane 320, which is shown minimized in the graphical display), weather data (pane 321) as well as messages received from a social media provider (e.g., Twitter messages displayed in pane 322).

A number of small panes 331-335 include a locator map 331 (showing the context of the geospatial display 310), a graph map 332 indicating relative power generator capacity and connections of power grid assets, a schematic view 333 of an electrical substation, an ArcWeld visualization 334 of real-time data (plotted along the circumference of the wheel as shown), and a word cloud 335, which displays more relevant and/or frequently used key terms in larger font sizes.

Also shown in the graphical display interface 300 are a number of selection controls, including toggle buttons 340 for turning display of certain classes of elements in the geospatial display 310 on or off, for example: weather data, graph map elements, and geospatial callout data from social media services. Other selection controls include property filters 350 for filtering displayed data based on associated: #hashtags, @mentions, status, sector, and time. Using the property filters 350, a user can filter the data displayed in the geospatial display 310 to be limited to a selected subset.

The graphical display interface 300 also shows a timeline interface display 360 of past, actual power grid load data 362 and future, forecasted power grid load data 363 along a time axis. A subset of geospatial data 310 can be selected for display by selecting the hatched portion 364 of time in the timeline. A number of event callouts (e.g., callout 367) are displayed along with the power grid data in the timeline interface display 360, such that particular events can be correlated to the timeline.

The following narrative example illustrates the advantages of multi-domain, multi-resolution situational awareness using the graphical display interface 300 to provide access to a unified representation. A severe weather event causes a failure in the Pacific DC Intertie 311. Real-time weather data received by an intermediary (e.g., Aggregation Server 130) from a first client can be used to illustrate the severe weather event in the geospatial display, but the weather data lacks any correlation to other data sources. Contingency violations (indicated by event callouts such as callout 315) detected by a second client (a power provider operating in the first dashed region 317) and a third client (a power provider operating in a second dashed region 318) are reported to the Aggregation Server. Concurrently, social media data is received from a third Client, a social media service, by the intermediary, including reports indicating power outages from customers: "Power outage in dntn and historical districts . . . " "Kingston Library is currently unable to open due to a power outage . . . " "Backhoe came into contact with electrical lines at 173 mass. Ave. . . . ", etc. Additional clients can provide, for example, cell-phone tower status reports, web cam footage, or other suitable data that can be collected, aggregated, and/or displayed according to user selections received using the graphical display interface 300, thereby enabling a quick, comprehensive analysis of data from a number of disparate sources.

Thus, combining data from multiple domains and displaying the combined data in a single set of unified interface objects providing input and/or display functions (e.g., the geospatial display 310, the window panes 320-322, the small panes 331-335, the toggle buttons 340, the filters 350, and the timeline interface display 360), the power grid operator gains increased insight into potential causes of power outages or power grid loads that would not be apparent if each of the sources were viewed separately. Further, by providing a customizable, unified interface as shown, authorities or operators of different, non-compliant systems are able to share data using a universal (yet customizable) representation.

Figure 3B:
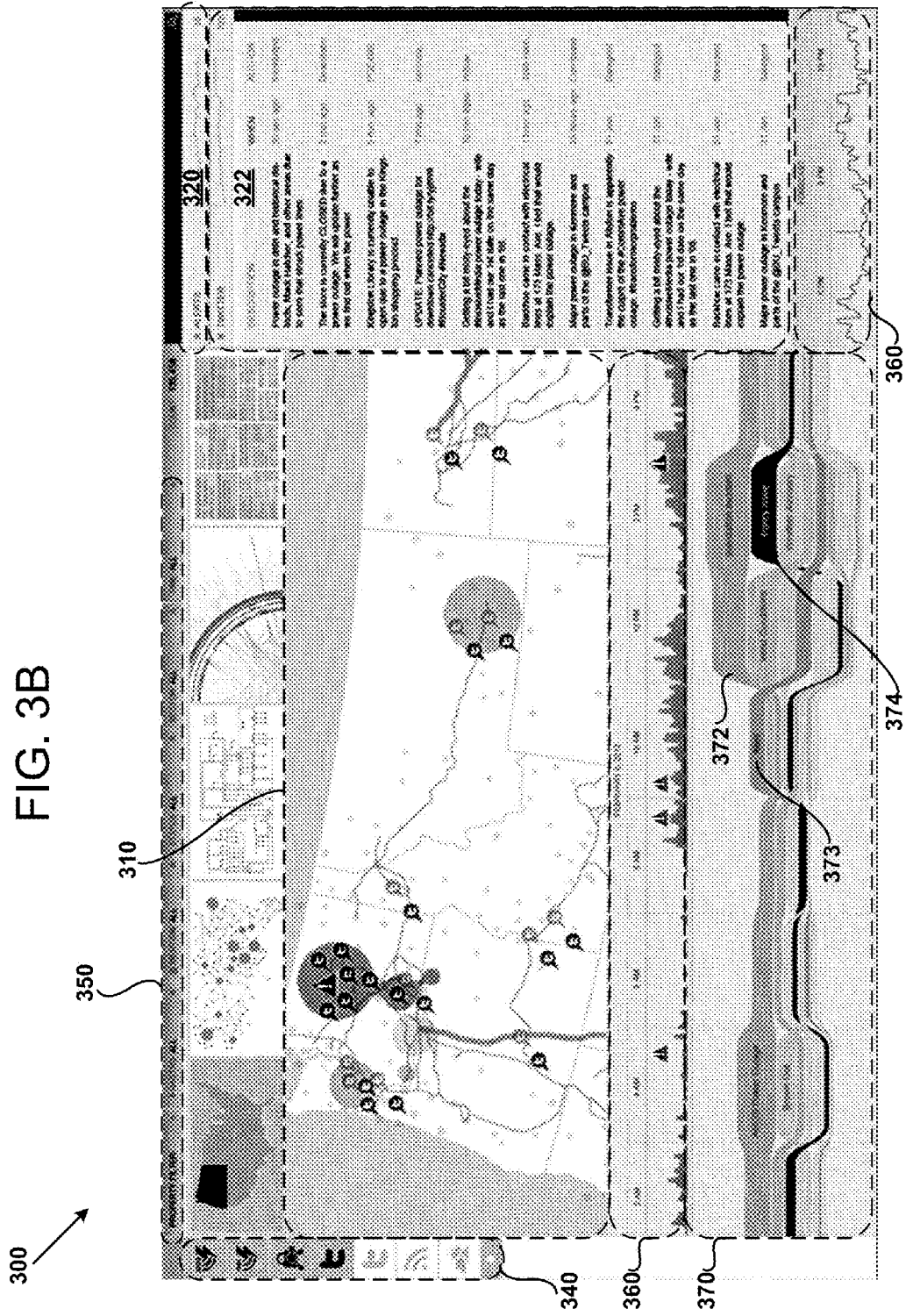

FIG. 3B illustrates the graphical display interface 300 after the user has changed the data selection to include a "theme river" 370 interface object, which displays trend lines (e.g., trend lines 372, 373, and 374) that indicate the popularity or magnitude of relevant reports or messages in real time. For example, a user can select an option from the graphical display interface 300 (as discussed above regarding FIG. 3A) in order to show the trend lines displayed at the bottom left of the display. Conversely, one of the trend lines can be selected (as shown, trend line 373) in order to highlight or select data shown or highlighted in the geospatial display 310. In some examples, selecting a trend line causes text associated with the trend line to be displayed in panes 320, 321, and/or 322. Keywords, tags, and/or other metadata associated with or relevant to an operator of the monitoring system can be selected, as appropriate. As shown in FIG. 3B, data has been grouped into theme river categories including "Alert," (373) "Substation Incident," (372) "Policy Issue," (374) "Weather Advisory," etc., and the widths of the trend lines vary based on the magnitude of data associated with the respective theme river category. Further the trend lines are sorted for each time period of the time line according to the respective magnitudes. Keywords relating to weather advisories, power outages, and other relevant events are shown displayed along a real-time scale. The trend lines can vary in thickness, and/or be sorted according to popularity or frequency of the terms, in order to better indicate the relevance of the keywords to the operating conditions of the infrastructure.

Figure 3C:
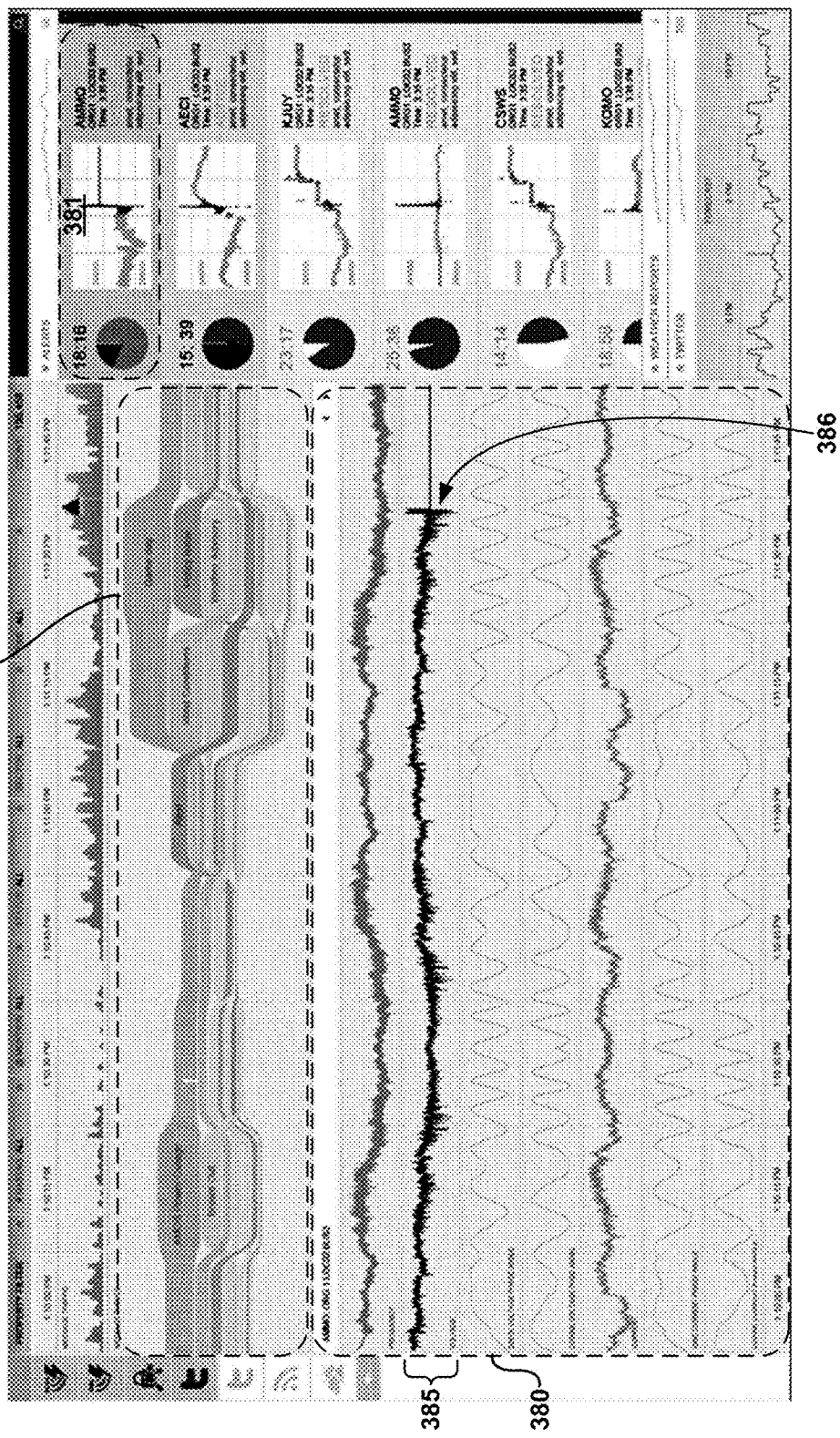

FIG. 3C illustrates the graphical display interface 300 after a user has customized the display interface to see desired data. As shown, a number of power grid operating parameters 380 for a selected power generation station 381 are plotted in real-time along a time axis, including frequency, voltage 385, current, and phase angle data. The visual display allows the operator to correlate events determined from message keywords (e.g., "game day" or a "brown out") to events that occur in the power grid in real time. For example, the voltage waveform for the selected power generation station 381 has flattened to zero at the indicated point 386 in time.

Figure 3D:
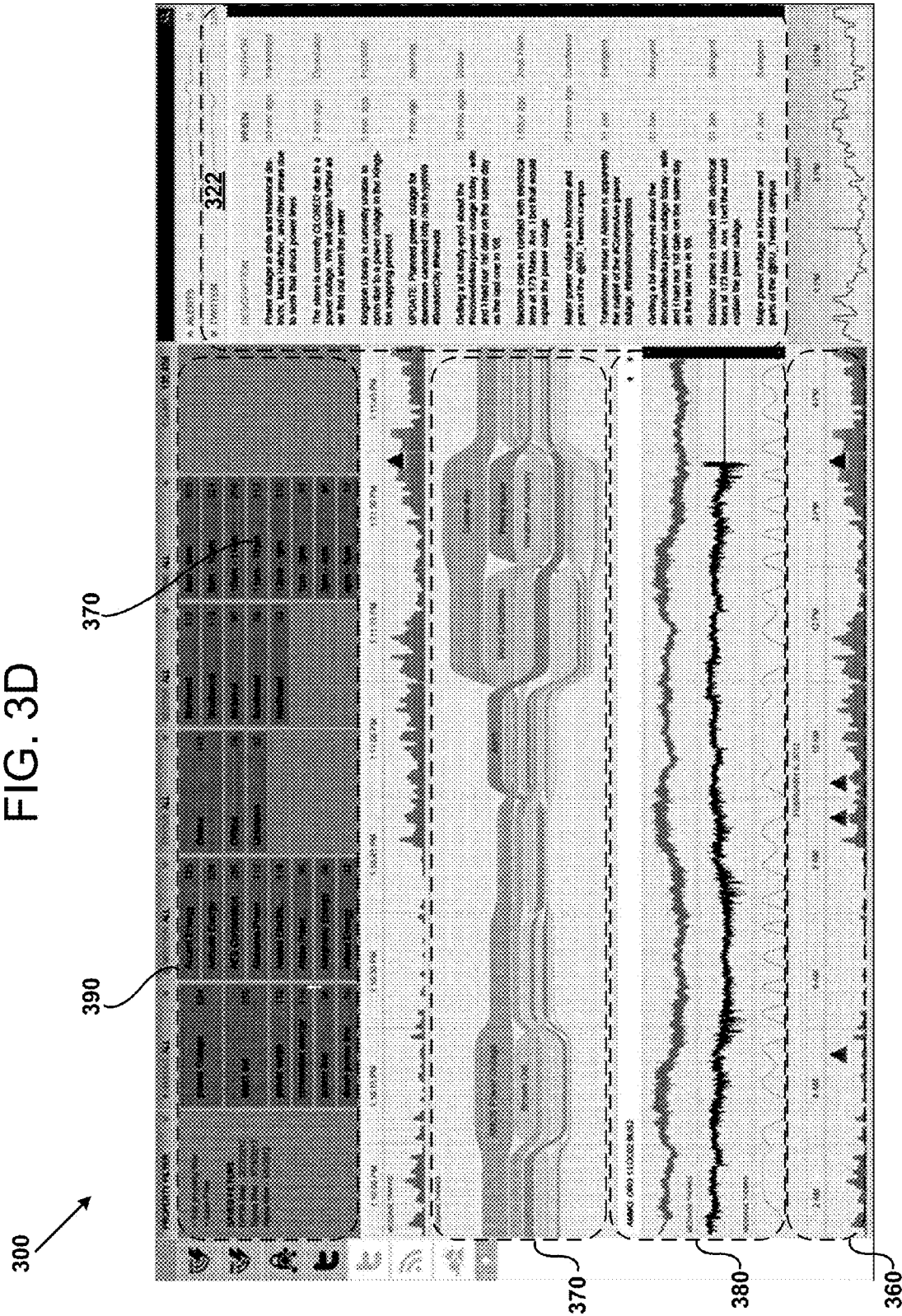

FIG. 3D illustrates the graphical display interface 300 after a user has customized the display to see desired data in another customized view. As shown, the theme river 370, power grid operating data 380, and social media (in pane 322) are displayed. Also shown at the top left is an interface object 390 that allows the user to select how to filter the multi-domain data according to a number of different categories of data, for example, according to key words or hash tags, according to power provider, according to infrastructure states (e.g., online or offline), geographical region, and/or time period. The number of hits for data within each respective category is shown.

Figure 3E:
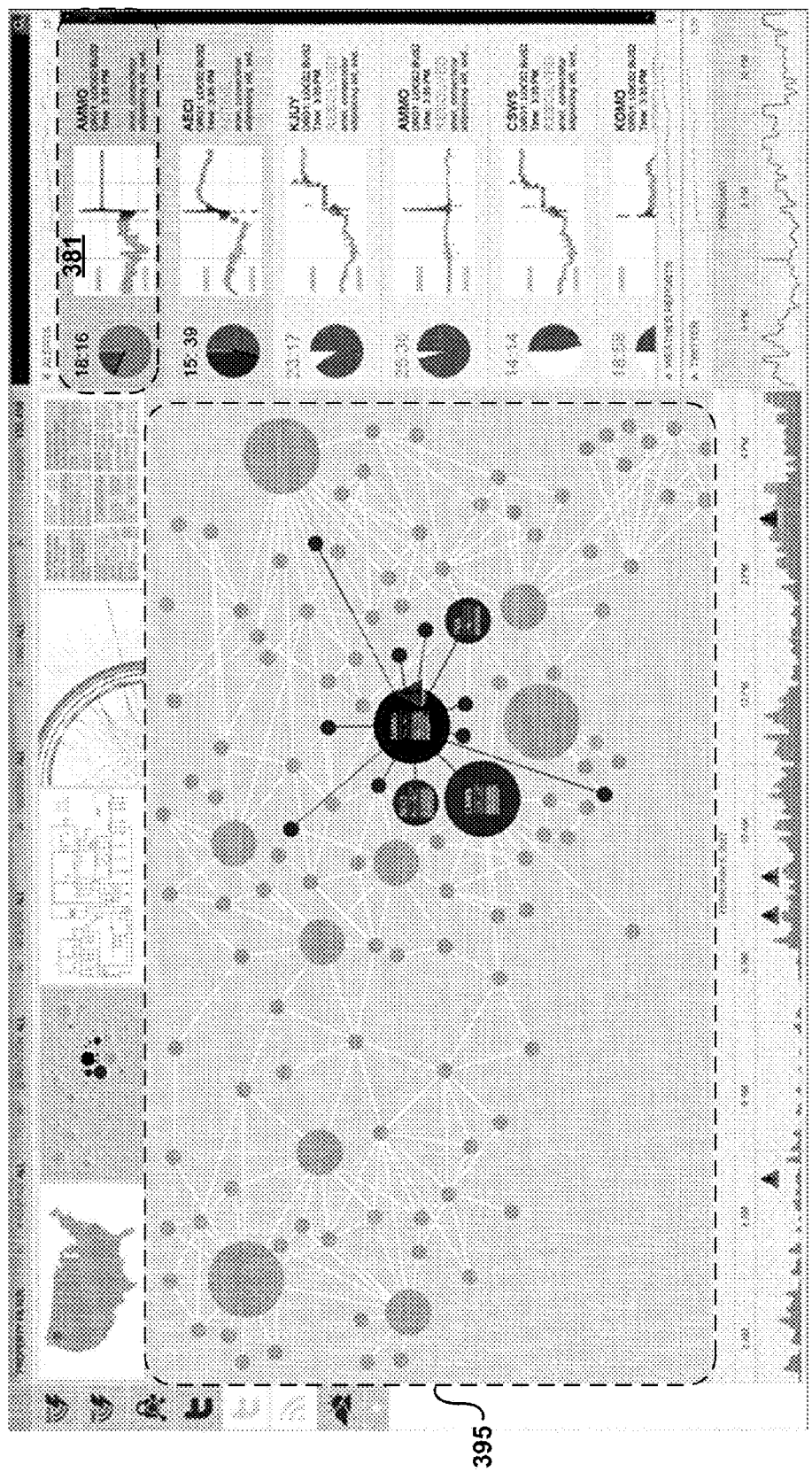

FIG. 3E illustrates the graphical display interface 300 after a user has customized the display to see selected power generator capacity and connections in a geospatial object 395. As shown, a number of power providers are displayed on a map of the United States, scaled according to the relative connectivity of the displayed power generators, instead of the cartographic distance. Real-time status alerts, such as the alert data 381 for the highlighted power generator, are displayed on the right-hand side of the graphical display interface 300.

In view of the many possible embodiments to which the principles of the disclosed invention may be applied, it should be recognized that the illustrated embodiments are only preferred examples of the invention and should not be taken as limiting the scope of the invention.

We claim:

1. A method of monitoring multiple-domain data for interdependent infrastructure systems, the method comprising:

receiving real-time data relevant to an infrastructure system from each of two or more different client domains;

aggregating the real-time data into a unified representation relevant to the infrastructure system by identifying relevance of the real-time data using an ontology and geolocation information derived from the real-time data, wherein the unified representation combines the real-time data from the different client domains into a single set of unified interface objects; and displaying the unified representation in real time using two or more customizable graphical user interfaces, including displaying real-time data for a plurality of categories as trend lines along a time axis, wherein each trend line is associated with one of the plurality of categories, wherein respective widths of the trend lines vary based on magnitudes of the real-time data for the associated categories, and wherein each of the customizable graphical user interfaces receives access to different portions of the unified representation based on permissions associated with each of the different client domains.

2. The method of claim 1, wherein each of the customizable graphical user interfaces provides controls for modifying the displaying with selection controls and property filters that operate on the unified representation.

3. The method of claim 2, wherein the displaying comprises displaying social media data and geospatial data.

4. The method of claim 2, wherein the displaying further comprises displaying at least one or more of the following along a time axis: clients, graphs, social media feeds, geospatial data, or power grid operating parameter data.

5. The method of claim 2, wherein the displaying comprises using a Scalable Reasoning System.

6. The method of claim 2, wherein the displaying comprises using a real-time data visualization framework to display the unified representation in real time.

7. The method of claim 1, wherein the unified representation combines data from two or more of the client domains into a single indicator for display using the customizable graphical user interfaces.

8. The method of claim 1, wherein the unified representation combines one or more keywords and frequency data associated with the one or more keywords.

9. The method of claim 1, wherein each of the customizable graphical user interfaces allows a respective user to control which portion of the unified representation to display using the customizable graphical user interfaces.

10. The method of claim 1, wherein the different client domains comprise at least one or more of the following: a utility infrastructure, a weather reporting service, a cyber-alert reporting service, or a social media provider.

11. One or more non-transitory computer-readable storage media storing computer-executable instructions that when executed by a computing device, cause the computing device to perform a method, the method comprising:

receiving real-time data from two or more different client domains relevant to a power infrastructure system, each of the client domains being for separate organizations or for different sub-organizations within the same organization, wherein the real-time data comprises social media data and power grid operating parameter data;

aggregating the real-time data into a unified representation relevant to the power infrastructure system, wherein the unified representation combines the real-time data into a single set of unified interface objects based on geospatial data associated with the real-time data; and providing access to different portions of the unified representation to one or more customizable graphical user interfaces based on access permissions for the real-time data, the access permissions being controlled by policies applied by data producers in the client domains, and the customizable graphical user interfaces being configured to display a portion of the unified representation using the geospatial data, the portion including real-time data for a plurality of categories displayed as trend lines along a time axis, wherein each trend line is associated with one of the plurality of categories, and wherein respective widths of the trend lines vary based on magnitudes of the real-time data for the associated categories.

12. An Aggregation Server, comprising:
one or more processors;
one or more graphical displays configured to display the provided unified representation in real-time; and
the computer-readable storage media of claim 11.

13. A system for providing real-time situational awareness in an infrastructure environment, the system comprising:
one or more databases;
one or more processors configured to store and access aggregated data stored in the databases; and
one or more computer-readable storage devices comprising instructions executable by the processors that cause the processors to perform a method, the instructions comprising:

instructions that cause the system to receive a first set of real-time data from a first client domain, the first set of real-time data comprising at least one or more of the following: power grid capacity data, power grid topology data, or power grid connectivity data, instructions that cause the system to receive a second set of real-time data from a second client domain, instructions that cause the system to aggregate data from the received first and second sets of real-time data and storing the aggregated data in the databases, instructions that cause the system to provide the aggregated data for display with a graphical display user interface to display at least a portion of the first set of real-time data and at least a portion of the second set of real-time data in a unified representation, and instructions that cause the system to restrict access to the real-time data according to permissions for a particular user accessing the provided graphical display user interface, the permissions designated by the respective client domain that sent the data to the system, wherein the instructions that cause the system to provide the aggregated data for display with the graphical display user interface include instructions for displaying a theme river, the theme river displaying real-time data as trend lines for a plurality of categories, the categories being sorted by magnitudes of the data within different designated time periods of a time scale.

14. The system of claim 13, wherein the instructions further comprise:
instructions that cause the system to display the portions of real-time data superimposed over a geospatial display.

15. The system of claim 13, wherein the second set of real-time data comprises social media data specific to the second client domain.

16. The system of claim 13, wherein the instructions that cause the system to provide the graphical display user interface include instructions for displaying at least one or more of the following: power grid capacity, power grid topology, or power grid connectivity data on a geospatial display.

17. The method of claim 1, wherein the infrastructure system is a first infrastructure system, the method further comprising:
   determining an access level for at least one authority for other infrastructure systems than the first infrastructure system;
   based on the access level, determining an amount and type of data to send to the at least one authority; and
   sending the determined amount and type of data to the at least one authority.

18. The method of claim 17, wherein the access level is determined based on permissions associated with a user or group associated with the at least one authority.

19. The method of claim 17, further comprising sending the data to an intermediary system for sharing with the other infrastructure systems, wherein access to the data by the other infrastructure systems is determined based at least in part on access permissions designated in the sent data by an authority for the first infrastructure system.

20. The method of claim 2, wherein the categories are sorted by magnitudes of the data within different designated time periods of a time scale.

21. The method of claim 1, wherein the permissions associated with each of the different client domains are controlled by policies applied by data producers in the client domains.

22. The Aggregation Server of claim 12, wherein the Aggregation Server is configured to share the real-time data of the power infrastructure system with other infrastructure systems, and wherein access to the real-time data by the other infrastructure systems is determined based at least on the access permissions.

23. The method of claim 1, wherein the infrastructure system is a power grid.

* * * * *